Nov. 21, 1939.   B. M. LEECE   2,180,474
VARIABLE SPEED TRANSMISSION
Filed May 22, 1937

INVENTOR.
BENNETT M. LEECE
BY Kwis Hudson & Kent
ATTORNEYS

Patented Nov. 21, 1939

2,180,474

UNITED STATES PATENT OFFICE 2,180,474

VARIABLE SPEED TRANSMISSION

Bennett M. Leece, Shaker Heights, Ohio, assignor to The Leece-Neville Company, Cleveland, Ohio, a corporation of Ohio Application May 22, 1937, Serial No. 144,219

1 Claim. (Cl. 74—291)

This invention relates to power transmission devices and, as its principal object, aims to provide an improved transmission having driving and driven members and novel means for varying or controlling the transmission ratio between said members.

Another object of my invention is to provide an improved transmission of the type having driving and driven members connected by gearing with which a rotatable ring gear cooperates and in which electro-dynamic braking means is employed to resist rotation of the ring gear.

A further object of my invention is to provide a variable speed transmission having driving and driven members connected by planetary gearing and having a ring gear meshing with the planet gear and in which electrically cooperating stator and rotor elements control the rotation of the ring gear.

Still another object of my invention is to provide an improved transmission device, of the type referred to, wherein the ring gear is connected with a rotor which carries conductors and is rotatable between poles of a stationary field magnet.

Yet another object of my invention is to provide an improved transmission device, of the type referred to, having means for varying the strength of the field magnet to thereby regulate the resistance offered to rotation of the ring gear.

Figure 1:
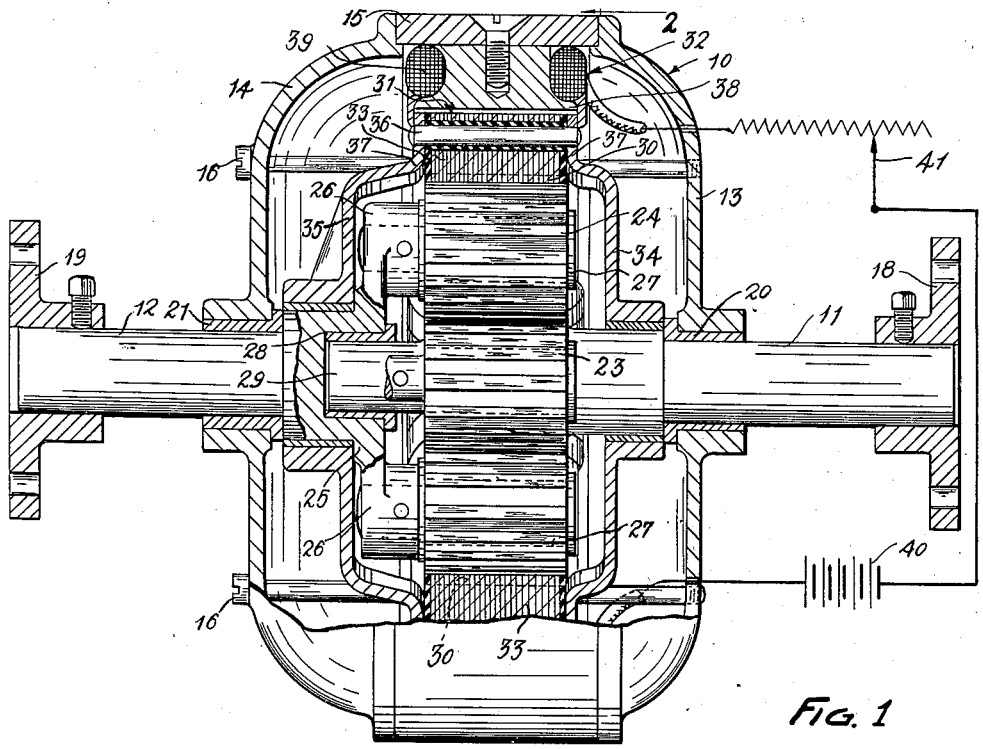
Figure 2:
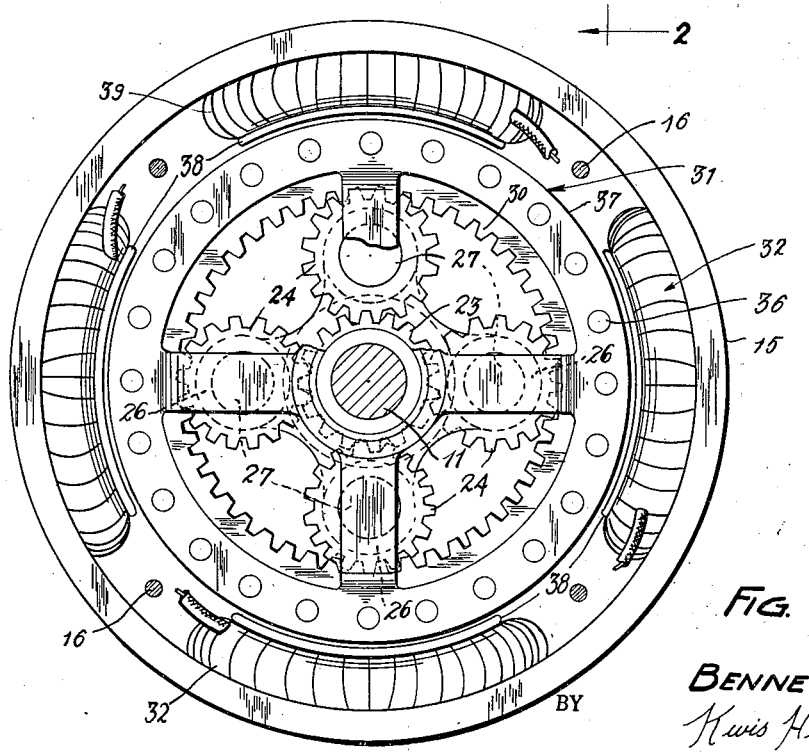

Other objects and advantages of my invention will be apparent from the following description when taken in conjunction with the accompanying sheet of drawings, in which Fig. 1 is a side view partly in elevation and partly in section showing a variable speed transmission embodying my invention, and Fig. 2 is an end view taken as indicated by line 2—2 of Fig. 1 with one of the casing sections removed.

In the accompanying drawing to which more detailed reference will presently be made, I have shown one embodiment of an improved transmission of the type having driving and driven members connected by gearing and in which novel means is employed for varying the transmission ratio. Before proceeding with the detailed description of the present embodiment of my invention, I wish it to be understood that the invention may be embodied in various other devices and forms of construction.

The transmission device here illustrated is provided with a housing 10 into which substantially axially aligned driving and driven members 11 and 12 extend. The housing may be of any suitable construction, such as that here illustrated, consisting of oppositely dished end sections or covers 13 and 14 and an intermediate ring section 15 with which the end sections are held in clamping engagement by suitable screws or bolts 16.

The driving and driven members 11 and 12 may be in the form of rotatable shafts, as here illustrated, which are provided respectively with flanges 18 and 19 at their outer ends for connection with the shafts or devices between which the transmission is to be used. The driving shaft 11 may be journaled in a bearing 20 provided in the housing section 13 and, similarly, the driven shaft 12 may be suitably journaled in a bearing 21 provided in the housing section 14.

For operatively connecting the shafts 11 and 12, I provide gearing in the housing 10 which may be in the form of a main or sun gear 23 coaxially carried by the shaft 11 and one or more planet gears 24 which mesh with the sun gear 23 and travel therearound. In this instance I show four such planet gears which are eccentrically carried by the inner end of the shaft 12. These planet gears may be conveniently mounted on the shaft 12 by providing the inner end of the latter with a head 25 which has radially extending arms 26 each carrying a shaft 27 upon which one of the planet gears is rotatably mounted. To assist in maintaining the desired alignment of the shafts 11 and 12, I may provide the head 25 with a bearing 28 into which an extension portion 29 of the shaft 11 extends.

The gear connection between the shafts 11 and 12 includes a ring gear 30 preferably in the form of an internal ring gear which meshes with the planet gears 24, and is rotatable about the common axis of the driving and driven shafts. Those skilled in the art of transmissions are aware that if the driving shaft of a planetary transmission, such as the driving shaft 11 of the transmission here illustrated, is rotated, the planet gears 24 will rotate and will transmit rotation to the ring gear. It is also well known that by resisting rotation of the ring gear while the driving shaft 11 is being rotated, the planet gears 24 will be made to travel around the sun gear 23 and will thus cause rotation of the driven shaft 12.

According to the present invention I control or resist the rotation of the ring gear 30 by means of a novel arrangement in which the ring gear is connected with a rotor 31 which forms a part of an electrical control and cooperates with a stationary field magnet 32. The rotor 31 is constructed with a laminated annular body 33 similar to that used in the rotors of electrical generators and has axially spaced spiders 34 and 35 by means of which the rotor is journaled for rotation on the shafts 11 and 12 at points just inwardly of the casing sections 13 and 14. The ring gear 30 may have the teeth thereof cut or formed directly on the inner periphery of the laminated body of the rotor 31, but this is not necessary, and, if desired, the ring gear may be separately formed and bolted or otherwise secured to the rotor.

The rotor of my novel control arrangement is provided with electrical conductors 36 which cut the lines of flux of the field magnet 32 as the rotor revolves. While various arrangements of electrical conductors may be employed, I prefer to use a rotor of the squirrel-cage type in which the conductors are short-circuited and in the form of the bars 36 here illustrated. These bars are insulated from the laminated body 32 but have their ends electrically connected with the annular conducting rims 37 of the spiders 34 and 35.

The field magnet 32 with which the rotor 31 cooperates may comprise a plurality of pole pieces 38 which are carried by the intermediate ring section 15 of the housing and which are energized by suitable field windings 39 mounted thereon. The field windings are suitably connected in an energizing circuit so that they can be energized from a storage battery 40 or other suitable source of energizing current. The field strength can be varied for a purpose to be presently explained by any suitable means, such as a resistance device 41 included in the energizing circuit.

In the operation of my improved transmission device, the shaft 11 is rotated by power applied thereto and causes rotation of the planet gears 24, as explained above. If slow speed rotation of the driven shaft 12 is desired, the field magnet is energized with a relatively low number of ampere-turns and the action of the magnetic field on the rotor 31 will cause the rotation of the ring gear to be resisted to a corresponding degree by the resulting dynamic braking effect. If rotation of the shaft 12 at a higher speed is desired, the excitation of the field magnet is increased, as by cutting resistance out of the field energizing circuit, and the resulting increased dynamic braking effect will provide additional resistance against rotation of the ring gear. Minimum or zero speed for the driven shaft 12 is obtained when the field magnet is substantially deenergized and the ring gear 30 is allowed to rotate freely. Maximum speed of rotation for the driven shaft 12 is obtained when maximum field strength is provided and the ring gear 30 is held stationary or permitted to rotate only relatively slowly.

From the foregoing description and the accompanying drawing it will now be readily seen that I have provided an improved variable speed transmission in which the novel dynamic braking means employed for resisting rotation of the ring gear affords a simple and efficient means for controlling and varying the transmission ratio. It will be seen, furthermore, that my improved device can be of very compact construction and can be conveniently embodied in a housing from which dust, water, and other foreign material is excluded.

While I have illustrated and described my improved transmission in a somewhat detailed manner, it will be understood of course that I do not wish to be limited to the precise details of construction and arrangements of parts herein disclosed, but regard my invention as including such changes and modifications as do not constitute a departure from the spirit of the invention and the scope of the appended claim.

Having thus described my invention, I claim:

A variable speed transmission comprising a housing having therein a plurality of spaced field poles carrying energizing windings, means for varying the excitation of said windings, a pair of substantially aligned shafts journaled on said housing and extending thereinto, a hollow body mounted for rotation in said housing between said poles and about said shafts, a gear within said hollow body and coaxially carried by one of said shafts, a gear carrier in said hollow body and eccentrically carried by the other of said shafts, a second gear rotatable on said carrier and meshing with the first-mentioned gear, said hollow body having a laminated annular rim portion carrying a series of circumferentially spaced short-circuited inductor bars adjacent its outer periphery, and a ring gear meshing with said second gear and comprising a series of gear teeth formed on said laminated rim portion and extending around its inner periphery.

BENNETT M. LEECE.